United States Patent [19]

Baur et al.

[11] 3,813,216

[45] May 28, 1974

[54] CONTINUOUS TUNNEL OVEN FOR BAKING AND/OR DRYING

[75] Inventors: Hellmuth Baur; Horst Schraft, Stuttgart, both of Germany

[73] Assignee: Firma Werner & Pfleiderer, Stuttgart, Germany

[22] Filed: Sept. 25, 1972

[21] Appl. No.: 291,530

[30] Foreign Application Priority Data

Oct. 8, 1971 Germany.......................... 2150191

[52] U.S. Cl................. 432/230, 432/145, 432/148, 432/202

[51] Int. Cl............................................. F27b 9/20

[58] Field of Search.......... 432/145, 148, 200, 202, 432/230

[56] References Cited

UNITED STATES PATENTS

| | | | |
|---|---|---|---|
| 2,669,068 | 2/1954 | Wambreuze | 432/145 |
| 3,272,156 | 9/1966 | Gilgore et al. | 432/148 X |
| 3,548,514 | 12/1970 | Smith et al. | 432/148 X |

*Primary Examiner*—John J. Camby

*Attorney, Agent, or Firm*—Browdy and Neimark

[57] ABSTRACT

A continuous tunnel oven for baking and/or drying with a continuous baking belt heated from above and below, and with radiant heating provided exclusively below the baking belt, including heating-gas nozzles provided along the length of the baking chamber to blow the heating gas down vertically on the baked products. Heating of the baking belt from below is accomplished exclusively by means of radiant heating.

7 Claims, 3 Drawing Figures

3
28
8
31
32
7
29
II
2
6
9
10
1
27
11
5
12
4
14
13
16
III
17
24
23
25
19
18
21
30

15
1
26
2
16
3
9
30
33
34
26
27

22
21
20
2
3
11
29
9
27
22
21
20
1

CONTINUOUS TUNNEL OVEN FOR BAKING AND/OR DRYING

The present invention concerns a continuous tunnel oven for baking and/or drying, with a baking belt passing through a baking chamber heated from above and below, and with radiant heating exclusively below the baking belt.

Austrian Pat. No. 217,973 teaches such a continuous tunnel in which radiant heating is also provided above the baking belt. Infrared burners or slit gas burners can be used for radiant heating, and steam can be produced simultaneously by this heat source.

German Pat. No. 1,071,612 which corresponds to U.S. Pat. No. 2,767,668, also teaches a baking oven in which heating gas is directed onto the baking belt from above and below. In addition, a nozzle box is provided above and below the baking belt, which is fitted with heating nozzles aimed at the baking belt. In this type of oven, the heater circuit length is limited to a few meters in order to maintain uniform outflow conditions. The exhaust gases are not recycled. In addition, this known type of oven is rather costly to build.

Further, German Patent No. 1, 070,111 which corresponds to U.S. Pat. No. 2,908,235, teaches a tunnel oven in which the baked products on the baking sheet are heated from below and above, partly by radiation and partly by a stream of heating gas. Heating gas channels are provided above and below the baking chamber, and have control valves that can be opened or shut to guide the heating gas flow to individual heating zones. Exact control of the heating gas flow and hence, the production of an exactly defined temperature profile over the length of the oven, is not possible under these conditions.

Furthermore, German Patent No. 1,081,391 teaches an oven in which radiant heating is provided above and below the baking belt, with exhaust openings to continuously draw off the heating gas, the openings being uniformly distributed over the length of the baked product conveyor. After being reheated, this gas is blown by means of a blower into the baking belt from above and below, through nozzle assemblies likewise distributed uniformly over the length and adjustable in groups or zones. This oven, too, is extremely costly to build.

Finally, U.S. Patent No. 2,289,629 teaches a chain-type baking oven in which radiant heating is provided below a conveying chain travelling in the baking chamber, this radiant heating providing essentially all of the baking heat. To ensure uniform baking chamber temperature, the baking chamber atmosphere is drawn off through a heater and blown back into the baking chamber, i.e., it is in constant circulation. The purpose of this circulation is to provide uniform browning of the baked product. The heated baking product atmosphere is returned through a single nozzle whose outlets are arranged so that the gas flows approximately horizontally into the baking chamber.

On the other hand, the purpose of the present invention is to equip a continuous tunnel oven of the type initially described with the simplest structural features, so as to shorten baking time with optimum thermal efficiency, by a high degree of heat transfer to the baked products and a change in the partial vapor pressure in the boundary layer of the baked products.

This goal is achieved according to the present invention by the fact that heating gas nozzles, arranged along the length of the baking chamber, are provided to blow heating gas at high velocity onto the baking belt, in order to heat the baked products on the baking belt, said nozzles extending slightly to either side and mounted perpendicular to said belt. The impact of the heating gas at high velocity from above onto the baked goods leads to a high heat transfer through convection and change in the partial vapor pressure in the boundary of the baked products.

The underlying principle of the invention is the fact that heating the baked product from below by convection, i.e., by means of heating gas blown directly onto it, is of no significant value, since no significant change in the partial pressure of the water vapor in the baked product can be achieved with solid or fine-mesh baking belts by using this type of heating gas flow. Radiant heating, however, is much less expensive from the structural standpoint than heating with heating gas.

Applying heat from above by convection according to the invention means that there is a much higher heat transfer to the baked product, and furthermore, a change is effected in the partial pressure of the vapor in the boundary layer of the baked product due to the high flow velocity of the heating gas. These two effects reduce the baking time significantly.

If desired, a so-called development zone can be provided for the baked product in the baking chamber itself, this zone not being provided with heating gas.

Advantageously, a burner with a heat exchanger attached can be provided to heat the heating gas; it is of further advantage if the radiant heating for heating from below is connected downstream from the outlet of the heat exchanger for the flue gases. In this connection, it is possible to use the flue gases first to heat up the heating gases (consisting of air) and then utilize their remaining residual heat to heat the radiant heater for heating from below. Utilizing this structure, the heater circuit length can be doubled, with the same circulation and heat exchanger efficiency, since the heating gases need not be split up for producing heating from above and below.

According to a further advantageous feature of the invention, several nozzles are combined in nozzle boxes, connected in parallel to a heating gas duct. It is of further advantage if the heating gas duct has a bypass that runs back to the heat exchanger.

It is advantageous in this regard if the nozzle boxes are connected via throttle elements, especially slides, to the heating gas duct. It is advantageous to use slit nozzles for the nozzles. By these measures a situation is created in which the closing or stepwise opening of the bypass can influence the entire heating gas flow, while the activation of the individual slides upstream from the nozzle boxes can be used to achieve a separation of the heating gas volume in a precisely defined form into the individual nozzle boxes. If return ducts are advantageously provided, and are connected to the sides of the baking chamber by throttle elements, the baking chamber can be divided into precisely defined heating zones in its temperature profile, while the flow velocity of the heated gas stream onto the baked product and hence the water vapor partial pressure at each individual point can be controlled. In this fashion, it is also possible to adjust the drying process, which is actually a significant part of the baking process. The return ducts lead to a suction chamber linked to the bypass, and a fresh-air duct is also connected to the suction chamber.

Further advantages and features of the present invention will become more apparent from the following detailed description of an embodiment taken in conjunction with the drawings wherein.

Figure 1:
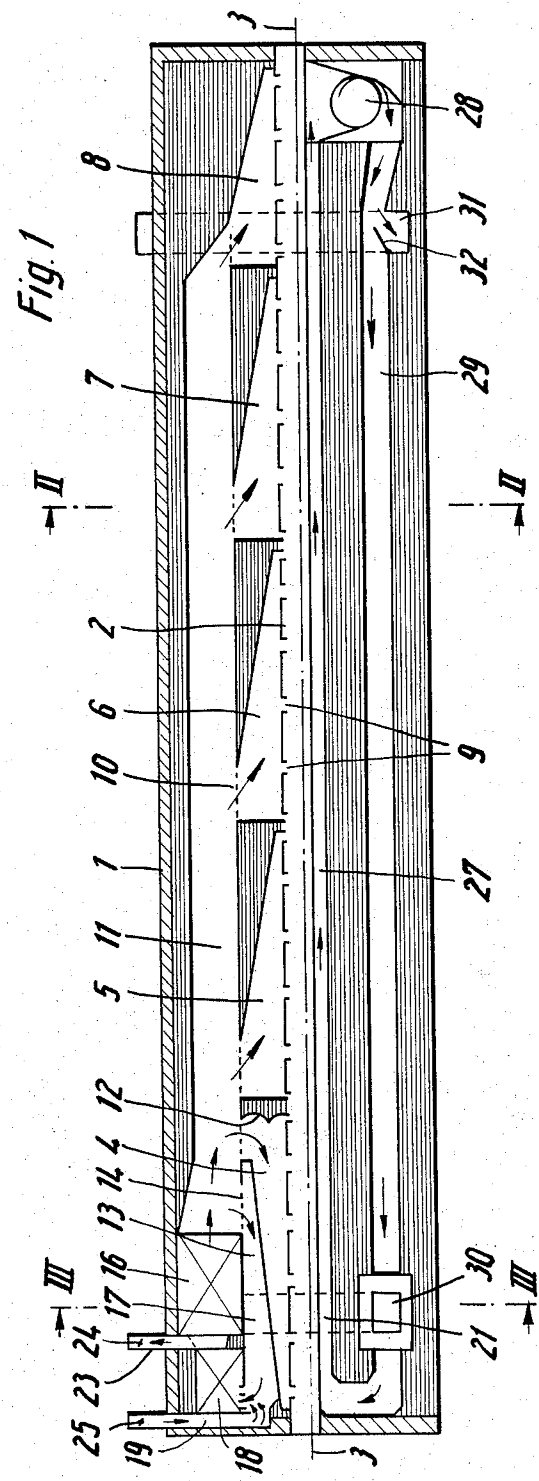
FIG. 1 shows a schematic representation of a lengthwise section through a continuous tunnel oven according to the invention.
Figure 3:
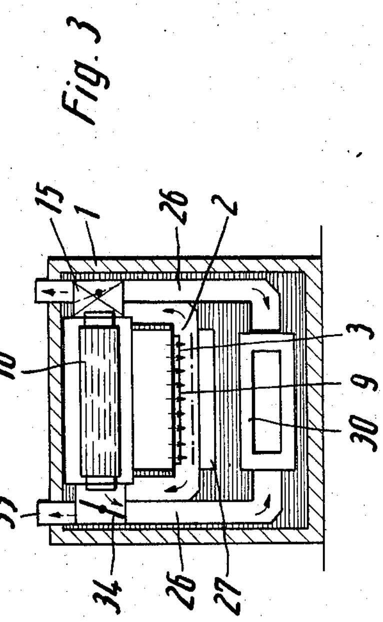
FIG. 3 shows a cross sectional view taken along line III-III of FIG. 1.
Figure 2:
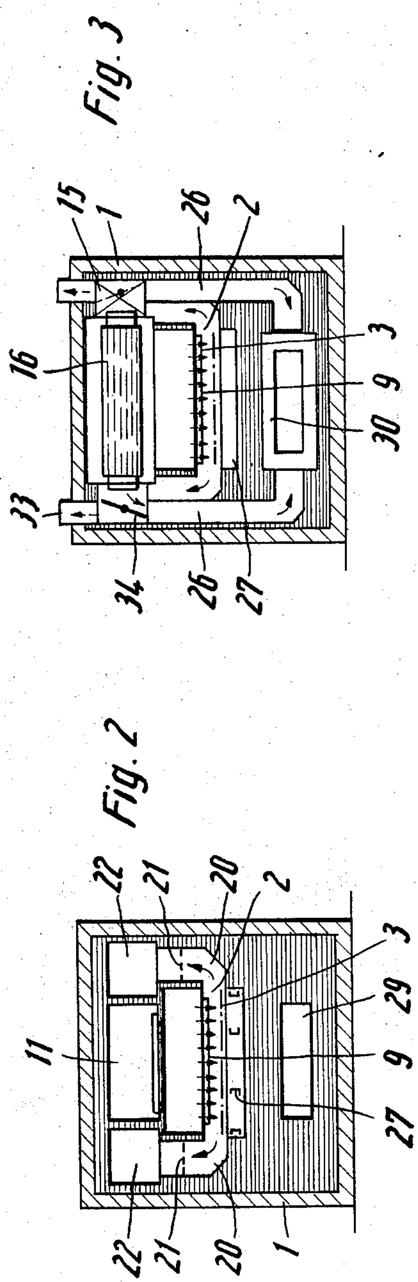
FIG. 2 shows a cross sectional view taken along line II—II of FIG. 1.

A tunnel oven according to the present invention has a roughly box-shaped housing 1, containing a tunnel-like baking chamber 2 running lengthwise. In the baking chamber 2, parallel to its upper and lower sides, is a baking belt 3, the upper side of which is used to transport the products to be baked or dried. The lower side of the baking belt 3 is guided back under housing 1 by means of a guide and drive rollers (not shown). The direction of travel of the baking belt 3 is from the intake (left, in FIG. 1) to the outlet (right, in FIG. 1). The baking belt preferably consists of a thin spring-steel band or a fine-mesh lattice band.

Nozzle boxes 4 to 8 are mounted above the baking chamber, and have slit nozzles 9 that are aimed perpendicularly to the baking belt 3. These slit nozzles 9 extend roughly over the width of the baking belt 3 and are mounted parallel to each other throughout the entire length of the baking chamber at intervals depending on the heat requirements.

Nozzle boxes 4 to 8 are each connected by slides 10 (shown only schematically) with a heating gas duct 11 that runs in a straight line for most of the length of the tunnel oven. Nozzles boxes 5,6,7 and 8 taper along the length of the oven so that, as the heating gas enters the nozzle box from the heating gas duct through slide 10, the same velocity profile for heating gas flow is retained over the entire length of a nozzle box, so that the heating gas emerges with the same velocity and hence, in the same volume in each nozzle box from the individual slit nozzles 9.

For structural reasons, the nozzle box 4 on the inlet side is arranged in reverse with respect to the other nozzle boxes 5 to 8. An appropriate baffle 12 is provided on the inlet side of the nozzle box 4 to ensure a clean feed of the heating gas stream.

A bypass 13 is provided around the nozzle box 4 on the inlet side, which is connected by a slide 14 to the beginning of the heating gas duct 11, i.e., slide 14 is arranged in the direction of flow of the heating gases moving in heating gas duct 11, upstream from the other slides 4 to 8 which run to nozzle boxes 4 to 8.

In the embodiment of the invention sketched and described herein, air is used as the heating gas, which is heated in a unit consisting of a burner 15 and a heat exchanger 16 operating in a crosscurrent mode.

A suction chamber 17 connected to bypass 13 is connected to the suction side of a blower 18, with a fresh-air duct 19 also connected to the suction side of the blower 18.

The heating gas blown into baking chamber 2 is guided into return ducts 22 extending the length of the oven via exhaust openings 20 on the sides of baking chamber 2 and via throttle elements 21, the return ducts being connected to the suction chamber 17.

Hence, the blower 18 receives a mixture of fresh air, recycled heating gas and heating gas tapped at bypass 13. An exhaust air duct 23 is connected to the pressure side of blower 18, with a certain amount of air being blown off via this exhaust duct. The amount of air blown off is regulated by a throttle element 24, connected to a throttle element 25, mounted in the fresh air duct 19. The amount of fresh air to be added is governed by the fact that the heating gas absorbs moisture when it strikes the product being baked or dried. Since the moisture content of the recycled heating gas must be reduced before it is reheated, a portion of this heating gas is bled off through the exhaust duct 23, while a corresponding amount of fresh air is drawn in via the fresh-air duct 19.

After the flue gases from the burner have passed through the crosscurrent heat exchanger 16, in the form of a tube nest heat exchanger, and have given up a portion of their heat there to the heating gas, they are recycled to the lower heating circuit via annular ducts 26 on both sides of the baking chamber 2.

The lower heating circuit consists mainly of an annular duct. Radiators 27 are mounted directly beneath the baking chamber; the flue gases flowing along the length of the oven give up their heat to these radiators, and this heat is then transmitted to the baking belt 3 from below by thermal radiation. At the outlet and of the tunnel a blower 28 is mounted to recycle the flue gases through a return duct 29. The annular ducts 26 open into this return duct in a mixing area 30, so that fresh flue gases supplied from heat exchanger 16 are combined and mixed with the recycled flue gases. Upstream of the blower 28, an exhaust gas flue 31 is connected to the recycling duct 29, with the same amount of flue gas bled off via an adjustable throttle device 32 as is freshly added in the mixing area 30.

A portion of the flue gases can be bled off after passing through the heat exchanger 16 through another flue 33. A regulating valve 34 is provided which diverts this portion of the flue gases either to the corresponding annular duct 26 or into flue 33, valve 34 being continuously adjustable to regulate the radiant heat in the radiator.

The organization of the heating gas circuit as described above makes it possible to set the temperature pattern exactly on the baking belt along the oven. A certain amount of heating gas emerges from the heat exchanger, this gas being divided into a bypass volume and a mainstream volume in an at least partly open bypass slide 14. Depending on whether the individual slides 10 are opened in the same fashion or differently, this mainstream flow is divided into different partial flows that enter nozzle boxes 4 to 8. The heating gas flow emerges from each nozzle box from all of the corresponding slit nozzles 9 at a constant velocity and strikes the products on the baking belt 3 perpendicularly. Since the heating gas strikes the baked products at a velocity of 20 to 30 meters per second on the average, the developing turbulence alters the boundary layer, leading to a high heat transfer. Simultaneously, the water vapor partial pressure around the baked products is decreased, leading to an increased drying effect. A regulated lateral bleeding off of the heating gas also ensures that no significant influence of the individual baking zones beneath the individual nozzle boxes is caused by adjacent nozzle boxes.

By means of the bypass slide 14, the total flow volume of heating gas in the main duct can be changed, while the individual slides 10 can be used to influence its apportionment among the several nozzle boxes and hence, the individual baking and drying zones.

Several of the tunnel ovens shown in the drawing and described above can be connected in series or as individual units, in order to achieve a sufficient total length of the oven.

What is claimed is:

1. A continuous tunnel oven for baking and/or drying comprising:

a tunnel housing having openings at both ends thereof;

a solid or fine-mesh baking belt passing through said housing by means of the openings therein;

heating means within said tunnel located above said belt for blowing heating gas at high velocity directly down onto said baking belt, said heating means comprising a plurality of nozzles located along the length of said housing;

a heat exchanger for heating the gas to be blown from said heating means;

a burner connected to said heat exchanger for creating the flue gases passing within said heat exchanger;

radiant heating means within said housing and below said belt for supplying radiant heat as the exclusive heating means below said belt; and passage means for feeding the flue gas exiting from said heat exchanger into said radiant heating means as the source of heat therefor.

2. An oven in accordance with claim 1 wherein said nozzles of said heating means each extend cross-wise across the width of said belt and extending slightly further to either side of said baking belt.

3. An oven in accordance with claim 1 wherein said heating means further includes a heating gas duct and a plurality of nozzle boxes in parallel with said heating gas duct and connected thereto by means of first throttle elements, wherein a plurality of said nozzles are combined in each of said nozzle boxes.

4. An oven according to claim 3, wherein said heating gas duct has a bypass means for returning heating gas to said heat exchanger prior to entry of the gas into said nozzle boxes.

5. An oven in accordance with claim 4 further including a suction chamber means for receiving heating gas used in said heating means and feeding the gas to said heat exchanger, return duct means, connected to the interior of said housing by second throttle elements, for returning heating gas to said suction chamber after the gas has passed through said nozzles, and a fresh air duct means for supplying fresh air to said suction chamber, wherein said bypass means returns the gas to said heat exchanger by way of said suction chamber.

6. An oven in accordance with claim 4 wherein said bypass means is connected in series with said heat exchanger and wherein said bypass means is located at the beginning of said heating gas duct in parallel with said nozzle boxes.

7. An oven according to claim 1, wherein said nozzles are slit nozzles.

* * * * *